United States Patent
DeSmet

(10) Patent No.: US 8,292,230 B2
(45) Date of Patent: Oct. 23, 2012

(54) DEVICE FOR DETECTING AND ELIMINATING THE PRESENCE OF A LAYER OF ICE OR LIQUID

(75) Inventor: Marie-Anne DeSmet, Monbrun (FR)

(73) Assignee: Airbus Operations SAS, Toulouse (FR)

(*) Notice: Subject to any disclaimer, the term of this patent is extended or adjusted under 35 U.S.C. 154(b) by 477 days.

(21) Appl. No.: 12/373,543

(22) PCT Filed: Jul. 20, 2007

(86) PCT No.: PCT/FR2007/051703
§ 371 (c)(1),
(2), (4) Date: Oct. 8, 2009

(87) PCT Pub. No.: WO2008/015356
PCT Pub. Date: Feb. 7, 2008

(65) Prior Publication Data
US 2010/0078521 A1    Apr. 1, 2010

(30) Foreign Application Priority Data
Aug. 1, 2006 (FR) .................... 06 53240

(51) Int. Cl.
*B64D 15/12* (2006.01)
(52) U.S. Cl. ............... 244/134 D; 244/134 R; 219/200; 219/201; 219/202
(58) Field of Classification Search ............. 244/134 D, 244/134 F, 134 R; 219/482, 483, 200, 202, 219/201, 203, 211, 213, 217, 218, 219
See application file for complete search history.

(56) References Cited

U.S. PATENT DOCUMENTS

| | | | |
|---|---|---|---|
| 4,766,369 A | 8/1988 | Weinstein | |
| 5,134,380 A | 7/1992 | Jonas | |
| 5,191,791 A | 3/1993 | Gerardi et al. | |
| 5,874,672 A | 2/1999 | Gerardi et al. | |
| 6,239,601 B1* | 5/2001 | Weinstein | 324/662 |
| 6,338,455 B1* | 1/2002 | Rauch et al. | 244/134 D |
| 6,384,611 B1 | 5/2002 | Wallace et al. | |
| 2005/0167427 A1* | 8/2005 | Petrenko | 219/772 |

FOREIGN PATENT DOCUMENTS

EP    0742145 A    11/1996

OTHER PUBLICATIONS

International Search Report, PCT/FR2007/051703, mailed Dec. 11, 2007.

* cited by examiner

*Primary Examiner* — Tien Dinh
*Assistant Examiner* — Nicholas McFall
(74) *Attorney, Agent, or Firm* — Perman & Green, LLP

(57) ABSTRACT

A device for detecting and eliminating a layer of ice formed on the surface of an aircraft structure or a liquid that has infiltrated inside of a structure and/or into the material of the structure. The device includes at least one pair of subnetworks of conductive elements, each subnetwork including at least one series of conductive elements, the aforementioned subnetworks being arranged in such a way that the interfitting between the conductive elements of the first subnetwork and the conductive elements of the second subnetwork forms a network of capacitive sensors, said the aforementioned conductive elements being embedded in an insulating material, each subnetwork of conductive elements being incorporated into a flexible substrate so that the entire assembly forms a flexible covering.

13 Claims, 2 Drawing Sheets

DEVICE FOR DETECTING AND ELIMINATING THE PRESENCE OF A LAYER OF ICE OR LIQUID

CROSS-REFERENCE TO RELATED APPLICATIONS

This application is the National Stage of International Application No. PCT/FR2007/051703 International Filing Date, 20 Jul. 2007, which designated the United States of America, and which International Application was published under PCT Article 21 (s) as WO Publication No. WO2008/015356 A1 and which claims priority from, and the benefit of, French Application No. 2006 53240 filed on 1 Aug. 2006, the disclosures of which are incorporated herein by reference in their entireties.

The aspects of the disclosed embodiments concern a device for detecting and eliminating the presence of a layer of ice formed on the outside of an aircraft structure or the presence of a liquid that has infiltrated inside a structure and/or into the material of the structure; said presence can be on an extended surface or a surface formed locally in some areas of the structure.

BACKGROUND

The presence of frost or ice on the most exposed and most critical structural elements of an aircraft, such as the wings, the tail and the stabilizers, can interfere with the operation of the aircraft. Basically, when there is an accumulation, the weight of the ice or snow added to the weight of the aircraft makes the aircraft heavier, so greater thrust is required for take-off. In addition, very slight surface roughness, as little as 0.4 mm thick, caused by the presence of ice or snow, changes the air flow affecting the aircraft's lift and rudders. The consequence of this roughness is substantially reduced lift, increased drag and less maneuverability of the aircraft, especially on the initial take-off and climb.

Another major consequence is due to the fact that the layers of ice that detach from the wings or the fuselage when the aircraft takes off or starts its climb can be sucked into the engines mounted on the rear of the fuselage, thus damaging or even stopping the engines. The layers of ice that detach can also cause damage due to their impact on critical surfaces such as the stabilizers.

There are currently means of detecting the presence of ice by making a tactile inspection or by using specially designed systems to detect ice, like ground ice detection systems (GIDS). But these means are difficult to use and are unsuited for an aircraft structure.

These means of detection are also separate from the means of defrosting. There are currently means of defrosting or removing ice during aerial operations under frosty conditions that consist of removing the frost or ice on the critical surfaces of the aircraft before take-off. To do so, physical-chemical means are used that consist of coating the critical surface with a product to limit and retard the formation of ice or putting an oozing liquid over the structure. These means require special facilities to supply them in airports. The defrosting liquid may cause clogging problems on the structure. These physical-chemical means also require the aircraft to be immobilized on the ground to defrost the critical surfaces. This takes a relatively long time before take-off and the presence of a qualified operator, thus entailing a relatively high cost.

There are also defrosting devices known for use when the aircraft is in flight, such as the device that uses a pneumatic system comprised of tubes of flexible material embedded in the leading edges whose alternating inflation and deflation break the ice when it has formed, or thermal defrosters composed of conduits for warm air taken from the engines. All these means require a major air supply, causing an increase in fuel consumption, thus hampering the performance of the turbojets. Such a device also requires enough space for the hoses and associated controls.

Thus far, there is no system that includes both means of detecting the presence of a layer of ice and means of defrosting to loosen the layer of ice in real time, particularly when the aircraft is in flight.

SUMMARY

The disclosed embodiments are aimed at proposing an advanced detecting and defrosting device that makes it possible to monitor the critical areas of the structures being controlled, whether or not they are accessible, and to start deicing when it detects the presence of a layer of ice.

The device in the disclosed embodiments is also made to eliminate the presence of a liquid that has infiltrated inside a structure, and/or sometimes infiltrated into the material of the structure and could diminish the mechanical resistance of the structure. The presence of this liquid is mainly due to cumulative infiltration during the use of the structure, not to some abnormality in the structure during its assembly. This liquid can be present over several centimeters within the structure. This liquid can be water, trapped in the walls due to condensation or hydraulic oil, for example Skydroll oil, which is a very corrosive liquid for the structures, and its presence, which is undesirable, can be associated with leaks in the actuators.

The problems to be solved for such a device are:
- to provide means of detecting and eliminating that are easily attached to the surface of the structures being controlled, whether or not they are accessible, or inside structures, while remaining negligible in terms of their weight and the space they take up and requiring very little electric power to operate;
- to provide means of automatic management so as to reduce the work of the operator and the pilot to the maximum and cut maintenance costs.

To do this, the disclosed embodiments have a device for detecting and eliminating a layer of ice formed on the outside of an aircraft structure or a liquid that has infiltrated inside the structure and/or into the material of the structure.

According to the disclosed embodiments, it has at least one pair of subnetworks of conductive elements, and each subnetwork has at least one series of conductive elements; said subnetworks are arranged so that when the conductive elements of the first subnetwork and the two conductive elements of the second subnetwork are fitted together, they form a network of capacitive sensors, and said conductive elements are incorporated into an insulating material, with each subnetwork of elements integrated into a flexible substrate so the entire assembly forms a flexible covering.

In one embodiment of the disclosed embodiments, said flexible substrates are arranged perpendicular to the surface of the structure, so that the insulating material is in direct contact with the layer of ice or close to the structure.

In another embodiment of the disclosed embodiments, said flexible substrates are arranged in a plane parallel to the plane of the surface of the structure, and the substrate forms the outside of said covering, which is partly porous and allows the ice or liquid to penetrate into the insulating material.

To eliminate the layer of ice, said covering is preferably attached to part of said outside of the structure and conforms to the shape of the structure.

To eliminate the presence of the liquid, said covering is preferably inserted into the structure, attached to the inside of the structure or incorporated into the material of which the structure is composed.

Advantageously, the surface of the structure is divided into a succession of sectors; the device has a network of capacitive sensors that eliminate the ice or liquid in each sector.

The dimensions and layout of the conductive elements are determined so they can detect a variation in capacity caused by the presence of ice or liquid that has penetrated into the insulating material.

According to the disclosed embodiments, the device also includes interface electronics installed on the periphery of at least one network of capacitive sensors to control said conductive elements; said electronics include a control circuit to provide electronic power to said conductive elements, and a microprocessor.

Advantageously, the microprocessor has a memory containing a table of reference values for capacity per pair of conductive elements, and means of differential analysis of the capacity values measured compared to the capacity values in the reference table. Said table of reference capacity values is predetermined by modeling or experimentally.

According to the disclosed embodiments, the means of differential analysis have means of generating a characteristic S-state signal due to the fact that an average differential value resulting from the difference between the reference capacity values and the capacity values measured by the capacitive sensors exceeds a threshold value that is representative of the presence of a layer of ice or the presence of a liquid; said S-state signal is transmitted by said microprocessor to said control circuit to trigger the sending of a current across said conductive elements.

According to the disclosed embodiments, in an aircraft with a device like the one described above, the device can be connected to an instrument panel in the cockpit via a communications box to display operational parameters and control the device.

BRIEF DESCRIPTION OF THE DRAWINGS

Other characteristics and advantages of the disclosed embodiments will be understood better from reading the description below, which refers to the following drawings.

DETAILED DESCRIPTION

The disclosed embodiments concern a device that makes it possible to detect and eliminate a layer of ice formed on the outside of an aircraft structure or the presence of a liquid inside a structure and/or infiltrated into the material of the structure; the disclosed embodiments are particularly applicable to complex forms of aircraft structures when the aircraft is in flight.

To create means of elimination in real time, the device has means specially made to foresee and detect the formation of a layer of ice or the presence of a liquid and means made to work like a device to eliminate it.

Figure 1A:
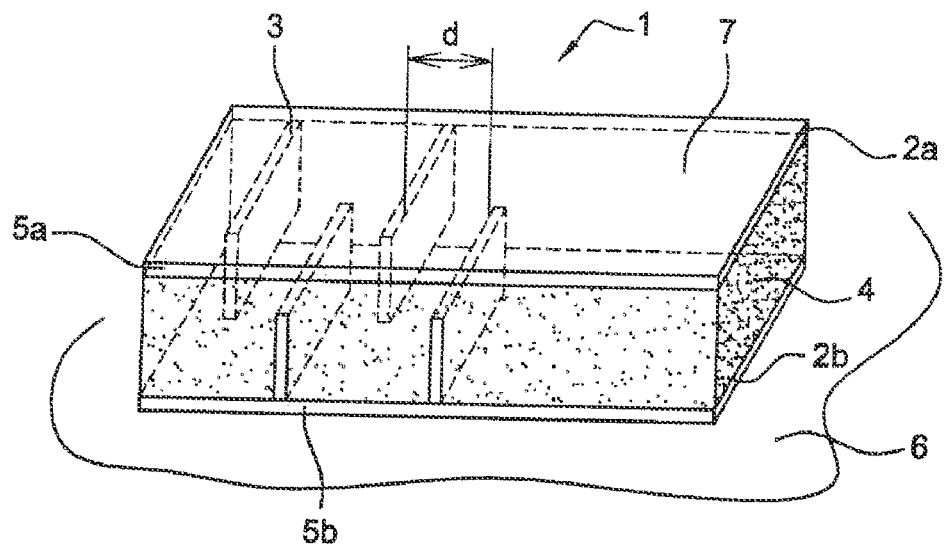
FIG. 1 A and FIG. 1 B show, respectively, a top partial sectional view of a network of capacitive sensors according to the two embodiments of the disclosed embodiments.
Figure 1B:
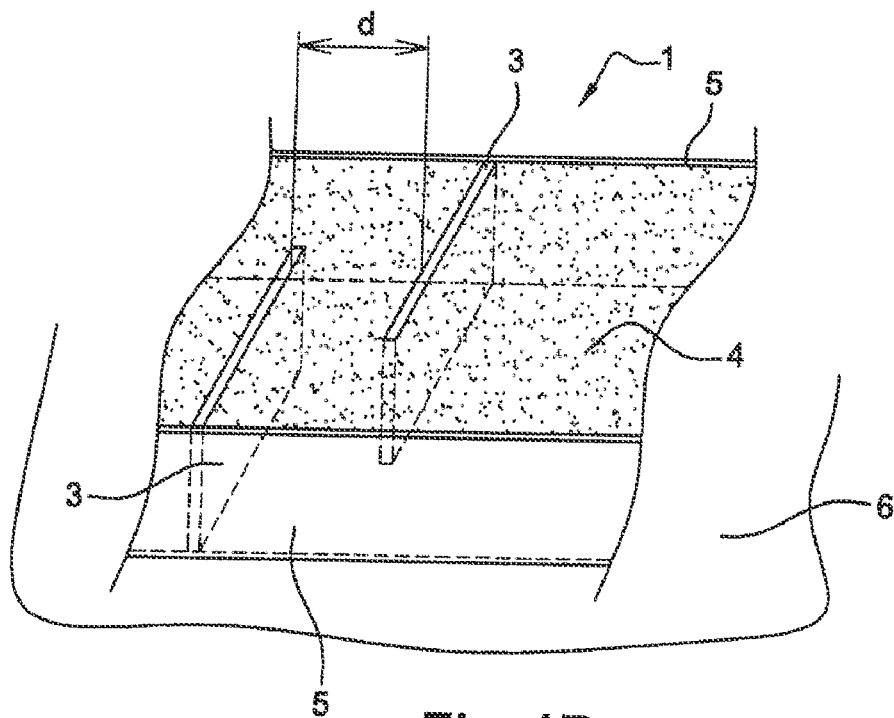
Figure 2:
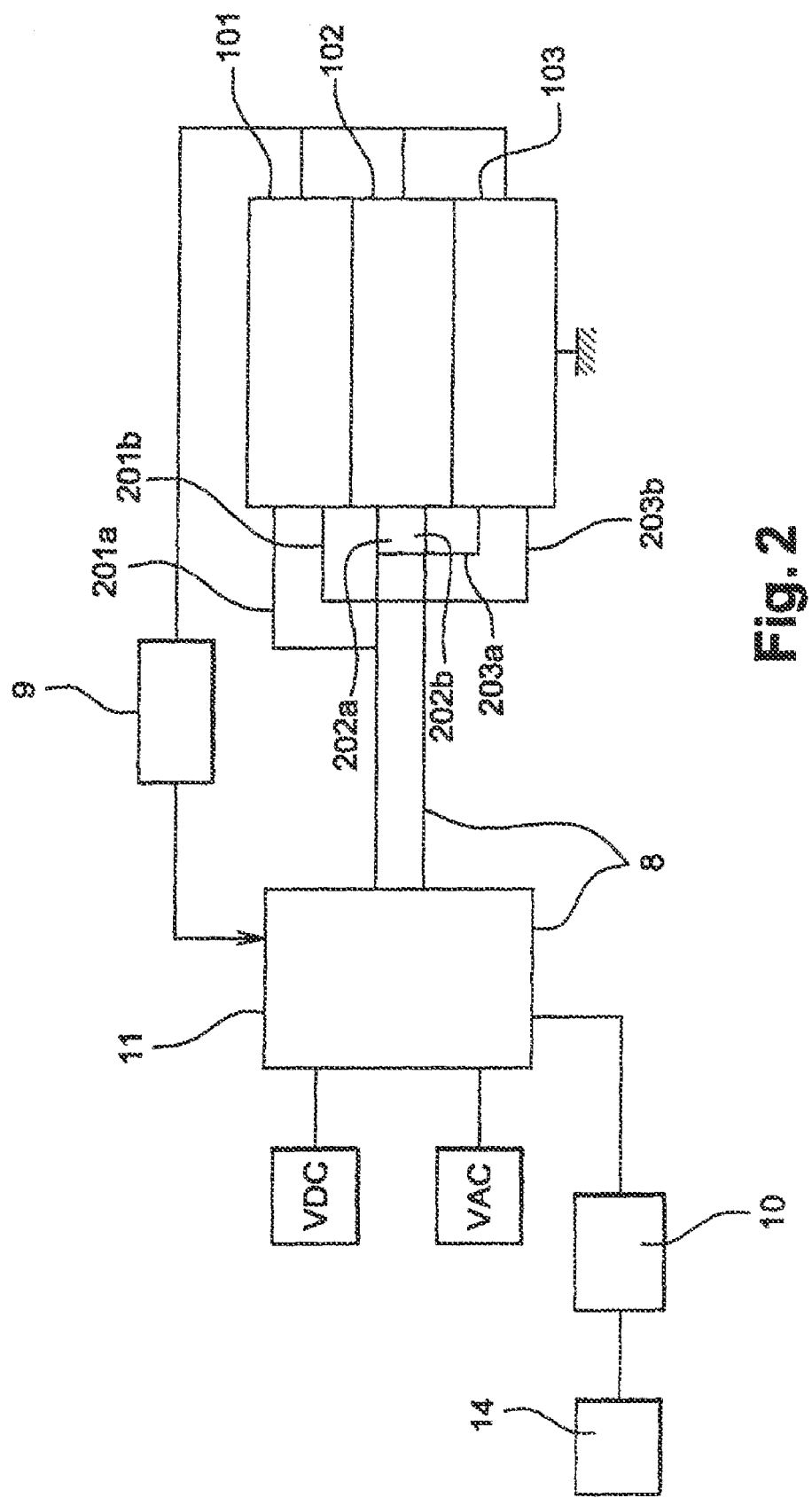
FIG. 2 is a schematic view of one example of a configuration of the assembly between the interface electronics and a unit of three networks of capacitive sensors.

Such a device and its operating system are described in FIGS. 1 and 2.

FIG. 1 A shows a first embodiment of the disclosed embodiments in which the device has two subnetworks of conductive elements, 2a and 2b.

The two subnetworks are located facing the conductive elements 3, so that when the elements in the first network 2a and the elements in the second network 2b are fitted together, they form a network of capacitive sensors.

For example, each conductive element 3 in the first subnetwork 2a is inserted between two adjacent elements in the second subnetwork 2b. The two subnetworks thus form a network of capacitive sensors 1. The assembly of conductive elements is submerged in an insulating material 4.

As shown in FIG. 1 A, the conductive elements 3 are integrated in a top flexible substrate 5a and a bottom flexible substrate 5b, respectively, which are arranged in a plane parallel to the plane of the surface of the structure 6. The top substrate 5a, whose face 7 faces the outside, is then partly porous to allow the ice or liquid to penetrate into the insulating material 4. The assembly forms a flexible covering.

FIG. 1 B shows a second embodiment of the disclosed embodiments in which the flexible substrates 5 are arranged in a plane perpendicular to the plane of the surface of the structure 6, so that the insulating material 4 sandwiched between the two substrates is in direct contact with the outside; in particular, it is in contact with a potential layer of ice or a liquid and is close to the structure. In addition, the face designed to stick to the surface of the structure has a flexible film into which the network of capacitive sensors is built, and the whole assembly thus also forms a flexible covering.

To eliminate the layer of ice, said covering is preferably attached to part of said outer surface of the structure 6 and conforms to the shape of the structure.

To eliminate the presence of the liquid, said covering is inserted into the structure, attached to a surface inside the structure or directly incorporated into the material of the structure, for example, during the phase when the structure is being manufactured.

In the two embodiments, the bottom flexible substrate or the flexible film is joined to the surface of the structure by means of an adhesive material.

As FIG. 1 A and FIG. 1 B show, the network of capacitive sensors constitutes the means of detecting the presence of a layer of ice or liquid.

When ice or liquid penetrates the insulating material, their presence causes a variation in the dielectric constant $\in$ of the material in which the conductive elements are submerged; this dielectric variation causes a variation in the capacity at the terminals of the condensers formed by the conductive elements. By comparing the average capacitive values measured and the average capacitive reference values corresponding to values in the absence of the layer of ice or liquid, the difference makes it possible to indicate quantitatively the presence of the layer of ice or liquid. A threshold value representative of the actual presence of a layer of ice or liquid is set.

Advantageously, the dimensions and layout of the conductive elements are set so they can detect a variation in capacity caused by a variation in the dielectric constant of the insulating material. Each conductive element is spaced far enough apart from the adjacent conductive elements to provide the appropriate electric insulation.

The means of defrosting are also comprised of conductive elements submerged in the insulating material that are heat-resistant elements that can dissipate electric power by the Joule effect when the device is working in elimination mode.

The conductive elements are made of a metal-resistant material, for example a silver or copper alloy. The network of conductive elements is obtained by optic lithography through a mask, then coupled by a plasma metallization stage or any other means of deposition. The dimensions of the conductive elements are in the dozens of microns.

The insulating material in which the conductive elements are submerged is preferably made of a material from the family of materials having a high coefficient of permittivity.

The device also has interface electronics to control and activate it. Preferably, these interface electronics are also built into the periphery of each network of capacitive sensors. This interface includes a control circuit 8 connecting the conductive elements to an electric power-supply box and a microprocessor 9, which connects the network of conductive elements to the box 11. Each line or each column of conductive elements is guided separately by the control circuit so that in the event of a breakdown in one line or one column of conductive elements, the network keeps on working.

FIG. 2 is a schematic view of one example of a control circuit for all three networks of capacitive sensors covering, for example, one zone on the surface of a structure. The electric power-supply box is connected to the three networks 101, 102, 103, respectively, via input and output current wires 201*a*, 201*b*, 202*a*, 202*b*, 203*a*, 203*b*, with the box itself connected to a continuous voltage source or an alternating voltage source. The wiring of each network to the box is independent of the wiring of the adjacent networks to minimize the risk of a breakdown of the device.

Advantageously, the surface of the structure to be defrosted can be divided into a succession of sectors to be defrosted; the network has a device on the surface of the structure to create a carpet covering the surface concerned to eliminate the ice or liquid in each sector. The density of the network depends, on one hand, on the size of the surface to be covered and, on the other, the degree of risk in the zone concerned. Advantageously, this network configuration makes it possible to continue to provide the functions of elimination and defrosting if one of the devices breaks down.

FIG. 2 illustrates a device comprised of three networks of sensors arranged so they are contiguous; they can also be arranged separately at regular or random intervals. The assembly forms a flexible covering that can be attached on one zone of the critical surface. When the surface is extended, several devices are then arranged in a network or at random intervals in an optimal configuration to eliminate the layer of ice or liquid.

The electric power-supply box 11 is connected to an instrument panel 14 located in the cockpit via a communications box 10 to display the operating parameters and to control the device.

As part of the device to protect against ice or liquid in real time, the microprocessor includes a memory containing a table of reference capacity values per pair of conductive elements and means of differential analysis of the capacity values measured by the capacitive sensors compared to the capacity values in the reference table. The table of reference capacity values is predetermined by modeling or experimentally.

The means of differential analysis include means of generating a characteristic S-state signal due to the fact that an average differential value resulting from the difference between the reference capacity values and the capacity values measured by the sensors exceeds a threshold value representative of the presence of a layer of ice on the surface of the structure or of liquid in the structure. The S-state signal is transmitted by the microprocessor to the power-supply box in order to trigger the sending of a current across the conductive elements.

The sending of the current in an assembly of networks of capacitive sensors can be sequential so as to create sequential heating. In FIG. 2, the three networks 101, 102 and 103 are heated one after the other. It can also be sent simultaneously in the three networks.

The power necessary to dissipate in order to obtain satisfactory deicing or evaporation of the liquid is low. In fact, based on the threshold value, the detection device makes it possible to prevent the formation of ice or liquid relatively early during the defrosting phase; the layer of ice is in direct contact with the network of conductive elements. The passage of the current into the conductive elements causes the ice in direct contact with the surface of the device to melt, which causes the layer of ice to detach. The temperature increase needed for surface melting also takes relatively low power. Generally, the current to be sent into the conductive elements to obtain sufficient defrosting is between 1 mA and 10 mA.

Advantageously, the device in the disclosed embodiments is combined with means of measuring the level of humidity and the temperature of the skin of the aircraft structure in flight. These means make it possible to trigger the device automatically in ice-detection mode based on the conditions for ice formation.

However, the device for detecting and eliminating ice or liquid can be triggered by the pilot manually as a preventive measure. In this case, the device is directly activated in an operating mode of elimination, and the conductive elements are then powered with continuous current.

The device in disclosed embodiments combining an electronic interface with the networks of capacitive sensors makes it possible to activate the device's elimination function only in the presence of a layer of ice or liquid with an optimal response time, making it possible to optimize the electric consumption of the device.

The invention claimed is:

1. A device for detecting and eliminating a layer of ice formed on the outside of an aircraft structure or a liquid that has infiltrated into the structure and/or into the material constituting the structure, said device including:
    at least one first subnetwork of conductive elements integrated into a first flexible substrate;
    at least one second subnetwork of conductive elements integrated into a second flexible substrate;
    the at least one first and second subnetworks submerged in an insulating material and fitted together to form a network of capacitive sensors between the first and second flexible substrates and the to form a flexible covering;
    said conductive elements comprising resistive heating elements that can be supplied by an electrical power supply when the presence of ice or liquid is detected in order to provide means for deicing.

2. The device of claim 1, wherein said flexible substrates are arranged perpendicular to a surface of the structure so that the insulating material is in direct contact with the layer of ice and proximate the surface of a structure.

3. The device of claim 1,
    wherein said flexible substrates are arranged in a plane parallel to a plane of a surface of the structure,
    and wherein one of the first and second flexible substrates comprises an outer face of said flexible covering,
    and wherein the flexible covering is partly porous to allow ice or liquid to penetrate into the insulating material.

4. The device of claim 1, wherein said flexible covering is attached to part of a surface of the structure and conforms to a shape of the structure.

5. The device of claim 1, wherein said flexible covering is inserted inside the structure, attached to an internal surface of the structure or incorporated into the material constituting the structure.

6. The device of claim 1, wherein a surface of the structure is divided into a succession of deicing sectors, and said device has an assembly of networks of capacitive sensors that eliminate ice or liquid in each sector.

7. The device of claim 1, wherein dimensions and a layout of the conductive elements are determined so the conductive elements can detect a variation in capacity caused by the presence of ice or liquid that has penetrated into the insulating material.

8. The device of claim 1, including interface electronics installed on a periphery of at least one pair of first and second subnetworks to control the at least one pair of first and second subnetworks, with said electronics including a microprocessor and at least one control circuit to provide electric power to conductive elements of the at least one pair of first and second subnetworks.

9. The device of claim 8, wherein the microprocessor has a memory containing a table of reference capacity values per pair of conductive elements, and means of differential analysis of the capacity values measured compared to the reference capacity values in the table.

10. The device of claim 8, wherein said table of reference capacity values is predetermined by modeling or experimentally.

11. The device of claim 9, wherein the means of differential analysis include means of generating a characteristic S-state signal due to the fact that an average differential value resulting from the difference between the reference capacity values and the capacity values measured at the terminals of the capacitive sensors exceeds a threshold value that is representative of the presence of a layer of ice on the surface of said structure or of a liquid in the structure and/or in the material of the structure, with said S-state signal being transmitted by said microprocessor to said control circuit to trigger the sending of a current across said conductive elements.

12. The device of claim 11, wherein the current sent into said conductive elements is between 5 mA and 10 mA.

13. An aircraft including the device of claim 1, connected to an instrument panel located in the cockpit via a communications box to display operating parameters of the device and to control said device.

* * * * *

UNITED STATES PATENT AND TRADEMARK OFFICE
CERTIFICATE OF CORRECTION

PATENT NO.        : 8,292,230 B2
APPLICATION NO.   : 12/373543
DATED             : October 23, 2012
INVENTOR(S)       : Marie-Anne DeSmet It is certified that error appears in the above-identified patent and that said Letters Patent is hereby corrected as shown below:

Column 6, line 52, Claim 1, delete "and the" and insert -- and --, therefor.

Signed and Sealed this
First Day of January, 2013

David J. Kappos
*Director of the United States Patent and Trademark Office*